Figure 1:
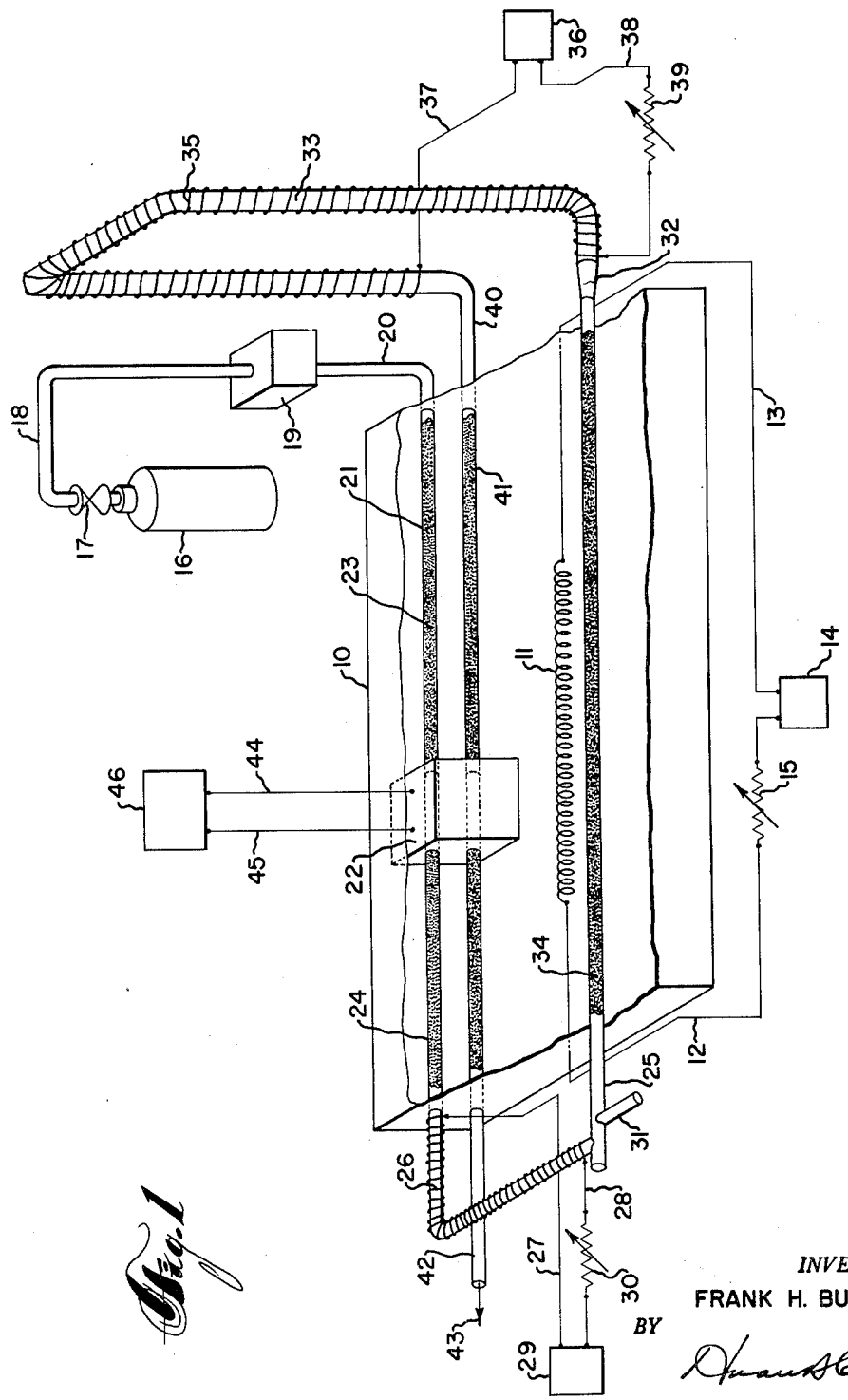

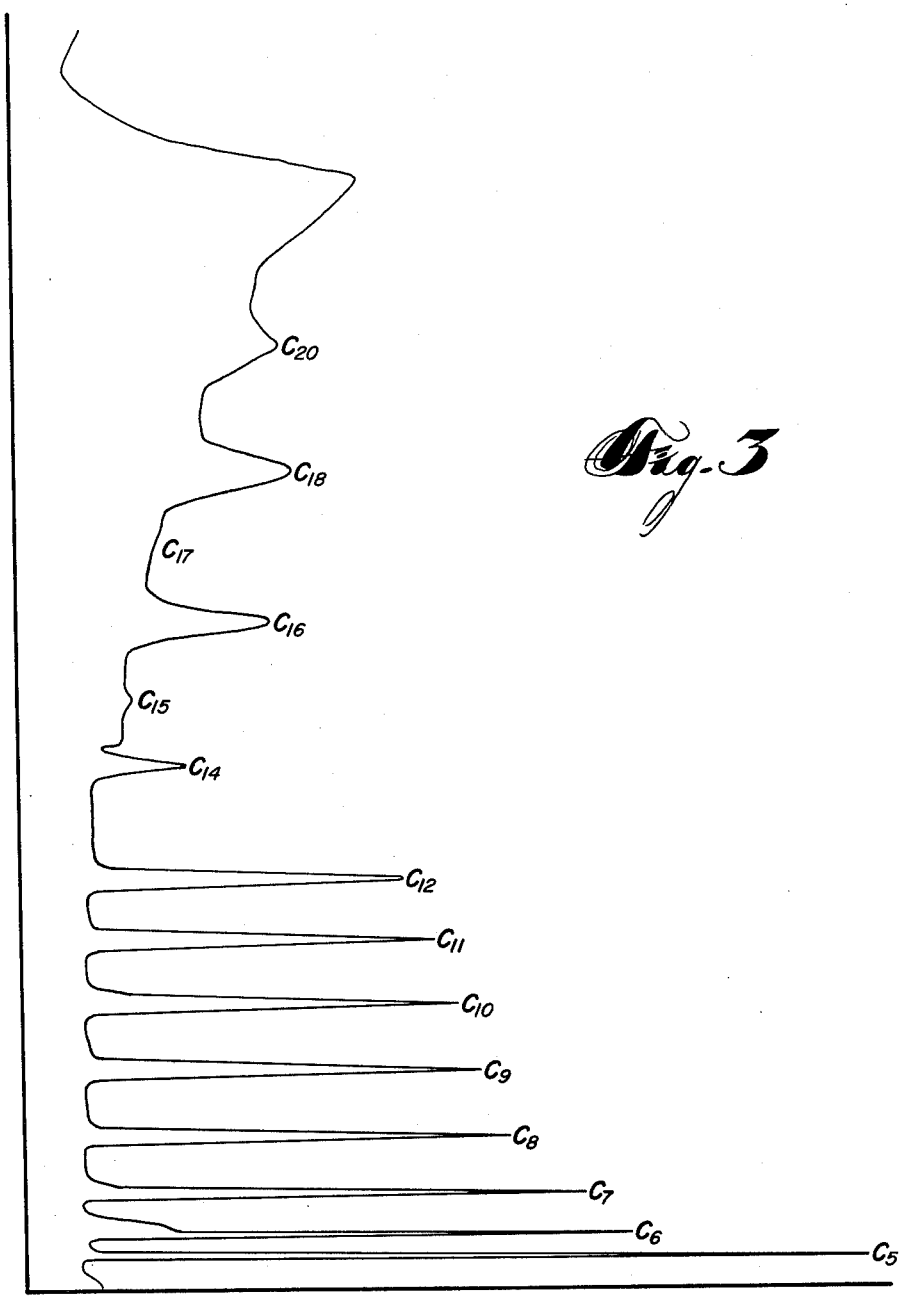

United States Patent Office 3,181,344
Patented May 4, 1965

3,181,344
CHROMATOGRAPHIC APPARATUS
Frank H. Burow, Cheswick, Pa., assignor to Gulf Research & Development Company, Pittsburgh, Pa., a corporation of Delaware
Filed Dec. 30, 1960, Ser. No. 79,602
2 Claims. (Cl. 73—23.1)

This invention relates to chromatographic separation apparatus, and more particularly the invention pertains to partition chromatographic apparatus adapted for the separation of multi-component mixtures of relatively wide boiling range.

It is well known to separate and analyze multi-component fluid mixtures by adsorption chromatography or partition chromatography. In adsorption chromatography a mixture of materials is separated on the basis of the difference in affinity for a solid adsorbent material which is employed in the chromatographic column. In partition chromatography a fluid mixture is separated by selectively partitioning its components between a stationary liquid phase and a moving gas phase. The stationary liquid phase is formed as a coating of a non-volatile solvent on a column of granular solid material and the gas phase is formed by flowing a carrier gas such as helium or hydrogen through the column. The manner in which the separation of a mixture is accomplished in partition chromatography can be explained by considering first what happens when a single pure compound is introduced to one end of the partition chromatography column. The compound will immediately partition itself into two portions, one of which will be in solution in the stationary liquid phase and the other of which will be in the gas phase. When the flow of carrier gas is initiated it moves that portion in the gas phase forward. As this occurs there is a continual partitioning between the material in the gas phase and that in the liquid phase. As a result the pure material moves along the column but at a slower speed than the carrier gas. The rate of movement is dependent upon the partition coefficient. Different materials have different partition coefficients and hence move at different speeds. This is the basis for the separation by this technique. A complex mixture of materials injected into the partition chromatography column will separate into components moving at different speeds so that, if the column is long enough, the components will emerge one by one from the column, usually in the order of boiling points for a homologous series.

In chromatography analytical methods the components of the mixture which emerge successively from the chromatographic column are identified in various suitable ways. For example, the effluent from the column is passed through a thermal conductivity cell connected with a recording potentiometer. The plot of potentiometer deflection against time provides a quantitative and qualitative analysis of the components of the mixture.

The analysis of wide boiling range hydrocarbon mixtures such as exemplified by paraffin waxes, crude petroleum oils, and the like is particularly difficult. Such materials containing relatively heavy constituents such as $C_{30}$ hydrocarbons, as well as light, normally gaseous constituents such as propane, methane, and ethane, are difficult to completely separate and analyze by partition chromatography. Very long chromatographic columns of the conventional type are needed for such separations, but if a long column is employed the time required to move the constituents of a mixture through the column may be excessive and impractical. Moreover, even with the use of a very long chromatographic column, satisfactory resolution of the lighter components of the mixture may not be attained. Another difficulty in separating and analyzing multi-component hydrocarbon mixtures is that the mixture may contain two components having similar partition coefficients, which as a result are retained in the chromatographic column for substantially the same time. When a mixture contains two components having close retention times and one of these components is large in volume relative to the other, its peak spread on the recorder plot may be great enough to mask completely the peak of the other component.

The present invention provides apparatus which is adapted for the separation and analysis of multi-component fluid mixtures which are difficult or impossible to analyze with known chromatographic equipment. The apparatus of the invention is characterized in its ability to effect separation of wide boiling range fluid mixtures in such a manner that most of the components of the mixture are separated, with each component represented by a sharp, readily distinguishable peak on the recorder plot.

Figure 2:
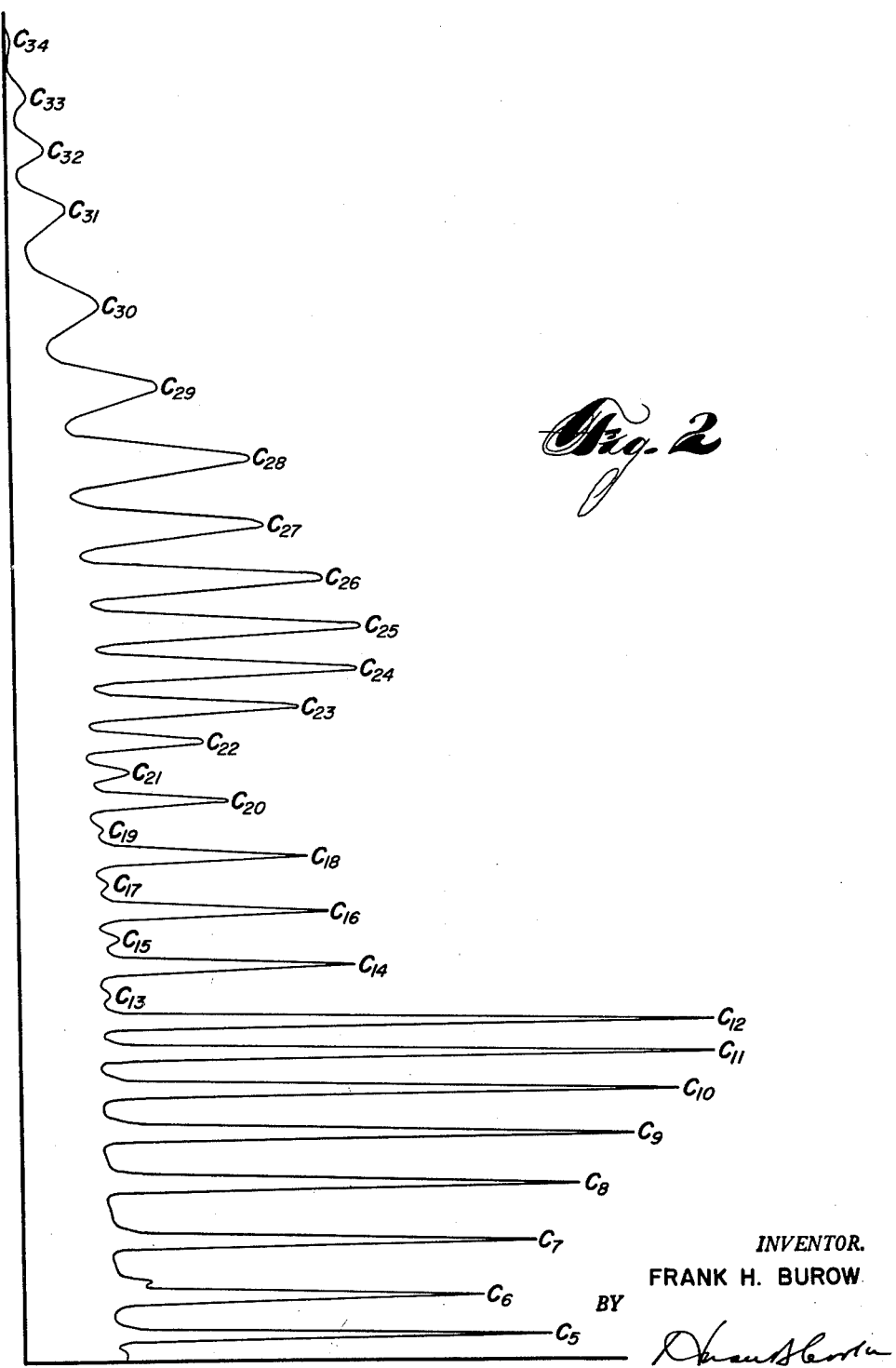

Referring briefly to the drawings, FIGURE 1 is a schematic representation, shown in oblique projection, partly broken away, of a preferred embodiment of the chromatographic apparatus of this invention. FIGURE 2 is a chromatogram of a wide boiling range hydrocarbon mixture obtained by the use of the apparatus illustrated in FIGURE 1. FIGURE 3 is a chromatogram obtained by separating the same wide boiling range hydrocarbon mixture indicated in FIGURE 2, under the same conditions as employed in the separation of the mixture indicated in FIGURE 2, but wherein the carrier gas preheating means and sample vaporizing means of the present invention were not employed.

The invention will be best understood by detailed reference to the accompanying schematic drawings of apparatus according to the invention and the following description of its use.

A solid block or housing preferably made of a metal such as stainless steel is designated by the numeral 10. Means is provided for maintaining block 10 at a constant temperature. Such means can conveniently comprise an electrical heating element 11 connected by leads 12 and 13 to a source of electrical energy 14, as shown, with provision of a variable rheostat 15 for controlling the heat output of the heating element 11. With such an arrangement the temperature within the block 10 can be maintained at a constant value by appropriate adjustment of the rheostat 15. Conventional temperature indicating means (not shown) can be provided in association with block 10 so that a desired constant temperature can be maintained therein by appropriate adjustment of the variable rheostat 15. A source of carrier gas such as helium is designated by the reference numeral 16 which is connected by a valved outlet 17 and conduit 18 to a flow regulator 19. The output of the flow regulator 19 is passed by conduit 20 and through conduit 21 which is machined in block 10, and thence into the reference channel (not shown in detail) of a thermal conductivity cell 22 which is disposed within housing 10. The conduit 21 within block 10 is preferably packed with particles of a metal 23, such as copper, brass, silver, iron, stainless steel, or the like. The metal particles 23 within conduit 21 being thermally conductive serve a heat exchange function and efficiently heat the carrier gas to the temperature maintained within block 10. The carrier gas passes from the reference channel (not shown) of the thermal conductivity cell 22 through conduit 24 which connects with sample vaporizing conduit 25. Heating coil 26 is provided on the portion of conduit 24 which extends outside of the block 10 for maintaining that portion of the conduit 24 at substantially the same temperature as block 10. Heating coil 26 is connected by leads 27 and 28 to a source of electrical energy 29, as shown, with the provision of a variable rheostat 30 for controlling the heat output of coil 26. The sample to be analyzed is introduced at the sample inlet 31 within conduit 25. The sample inlet 31 can be of any suitable design and may be, for example, a serum cap into which a feed mixture is injected with a hypodermic syringe. The sample vaporizing conduit 25 extends through constant temperature block 10 and connects with inlet 32 of chromatographic column 33 which is mounted outside of block 10. That portion of sample vaporizing conduit 25 which lies within block 10 is packed with metal particles 34, which particles function as a heat exchange element for the gas sample passing through the conduit. By this means, the sample to be analyzed is raised to a desired elevated temperature prior to its entry into chromatographic column 33.

Conveniently chromatographic column 33 can comprise stainless steel thin-wall tubing having a length of a few inches to several feet or more depending upon the composition of the sample to be analyzed. For analyzing multi-component hydrocarbon mixtures such as crude petroleum oils, a chromatographic column having a length of 2 feet and an inside diameter of $3/16$ inch has been found to be eminently suitable. Column 33 as shown in the drawing is essentially U-shaped. The column can take other forms, such as a coil, in the interest of compactness. The chromatographic column 33 is packed with solid particles of the type conventionally employed in adsorption or partition chromatography. For adsorption chromatography exemplary packings are bauxite, activated carbon, silica gel, etc. For partition chromatography column 33 can be packed with solid materials such as granular kieselguhr, crushed firebrick, and the like on which there is applied a surface coating of any of the many solvents that are suitable for use in high-temperature partition chromatography. Suitable coating liquids include high-boiling organic solvents such as dioctyl phthalate, dinonyl phthalate, dioctyl sebacate, paraffin wax, silicone fluids, silicone gum, and so forth. It is particularly advantageous to employ a partitioning liquid of high viscosity since such liquids have a reduced tendency to migrate at elevated temperatures. During partition chromatography separations carried out at room temperature or at only slightly elevated temperatures, the partitioning liquid is stationary for all practical purposes, but even at low temperature the liquid has a slight tendency to flow. The flow is induced by gravity and by drag in the moving carrier gas. When the partition chromatography column is operated at higher temperatures the liquid coating on the granular materials shows a tendency to migrate. Therefore to minimize this condition it is preferred to use a partitioning liquid of high viscosity.

A heating element 35 in the form of a wire coil is disposed around the entire length of chromatographic column 33 so that the column may be heated during the course of a separation. The heating element 35 is energized from a power supply 36 through leads 37 and 38. The heat output of heating element 35 is controlled by a variable rheostat 39. The outlet end of the partitioning column 33 is connected to the detector channel (not shown) in the thermal conductivity cell 22 by means of conduit 40. Metal particles 41 are packed within conduit 40 to serve as a heat exchange element therein. The gases conducted by the conduit 40 and the detector channel (not shown) of the thermal conductivity cell 22 are vented through conduit 42 as indicated by arrow 43.

The thermal conductivity cell 22 is conventional in character and is for the purpose of producing an electrical potential that is a function of the difference between the thermal conductivities of the carrier gas passed therethrough and the eluant from the chromatographic column 33. The electrical potential produced by the thermal conductivity cell 22 is fed by means of leads 44 and 45 to recording potentiometer 46 for recording such electrical potential versus time. If desired, the recording potentiometer 46 can be associated with an integrating device or system whereby the integrated numerical value for the various components can be obtained directly. The integrating device can, for example, be a mechanical integrator of the ball-and-disk type or a circuit containing electronic integrating means can be used, as is well known in the art.

As is known in the art of chromatographic analysis the carrier gas reference stream can be physically compared to the eluant of the partitioning column on a basis other than thermal conductivity as, for example, on the basis of their densities, in which case a gas density balance is substituted for the thermal conductivity cell 22. It is believed clear therefore that any of the conventional gas detecting devices can be employed in place of thermal conductivity cell 22.

The operation of the illustrated apparatus will now be described in connection with the separation of a mixture of hydrocarbons containing from 5 to 35 carbon atoms. A carrier gas comprising helium from supply source 16 controlled by flow regulator 19 passes through conduits 20 and 21 to the reference cell of thermal conductivity cell 22. The temperature of block 10 during this time is maintained relatively constant at about 400° C. by means of heater 11 and appropriate adjustment of the variable rheostat 15 which controls the heat output of heating element 11. The carrier gas flows through conduit 21 at a rate of about 50 cubic centimeters per minute and in flowing through this conduit receives heat from the metal packing material 23 which is disposed within the conduit and is effectively heated to a temperature of about 400° C. before entry into thermal conductivity cell 22. The carrier gas passes from thermal conductivity cell 22 through conduits 24 and 25, and then through chromatographic column 33 whereby the system is flushed free of all elutable contaminants. The heating coil 26 is energized by means of variable rheostat 30 so as to maintain that portion of conduit 24 outside of block 10 at a temperature of about 400° C.

The sample to be analyzed is introduced into inlet 31 of sample conduit 25 and is carried by the helium carrier gas to the inlet 32 of chromatographic column 33. The packing material 34 consisting of metal particles which is disposed within the intermediate portion of conduit 25 also functions as a heat exchange element and raises the temperature of the carrier gas and sample to be analyzed to about 400° C. at the time of entry into chromatographic column 33. At this time chromatographic column 33 does not receive any heat from heating coil 35 and the temperature of the carrier gas and sample decreases while passing through column 33, thus establishing a temperature gradient therein. The temperature gradient existing along the length of chromatographic column 33 is advantageous in that the heavier components of the sample move through the column at a considerably slower speed than the lighter components. Thus, the sample to be analyzed is spread out over the length of column 33 with the lighter components of the sample ahead of the heavier components. After sufficient time has elapsed to insure that the high boiling components of the sample have entered chromatographic column 33, the heating element 35 is energized so as to raise the temperature of the column 33 throughout its length. For analysis of hydrocarbon mixtures such as crude oils and the like raising the temperature of the chromatographic column to a final temperature of about 350° C. is generally sufficient. For the analysis of other materials higher temperatures may be desirable. By gradually increasing the temperature of column 33, the lighter components of the sample are first eluted from the column followed by the higher molecular weight components in well-defined fractions.

It has been found that the apparatus described above provides enhanced separations of multi-component fluid mixtures of wide boiling range. With the described apparatus substantially all of the components of a fluid mixture are separated into well-defined fractions which are easily identified by the sharp peak produced on the recorder plot.

In the apparatus of the invention, the temperature of the reference stream of carrier gas and the eluant from the partitioning column is the same as these streams pass through the thermal conductivity cell, thus insuring utmost accuracy in detection of the components in the sample mixture. This end is accomplished by the strategic disposition of heat exchange elements within the apparatus. Also, in the described apparatus the sample which is to be analyzed is carried by a heated carrier medium and is also heated to a desired elevated temperature before entry into the chromatographic column. These features contribute significantly to the enhanced separations obtained with the use of the present apparatus. Thus, FIGURE 2 is a recorder plot obtained with an apparatus constructed in accordance with the invention in separating a multi-component wide boiling range hydrocarbon mixture of from $C_5$ to $C_{35}$. FIGURE 3 is a recorder plot obtained from the separation of the same hydrocarbon mixture in partition chromatographic apparatus in which only the sample to be analyzed is heated to an elevated temperature prior to entry into the partitioning column. In each case, the temperature of the partitioning column was increased from 30° C. to a final temperature of 300° C. As will be noted from FIGURES 2 and 3 with the apparatus of the invention, the hydrocarbon components in the range of from $C_5$ to $C_{35}$ were separated and detected, with each component being represented on the recorder plot by a sharp, clearly distinguishable peak. In contrast as shown in FIGURE 3, the apparatus, in which only the sample was preheated prior to entry into the partitioning column, failed to provide satisfactory separation of the heavy hydrocarbon components. Moreover, the peaks on the recorder plot representing the relatively few components which were detected were not sharp but tended to be broad as shown.

Those modifications and equivalents which fall within the spirit of the invention and the scope of the appended claims are to be considered part of the invention.

I claim:

1. Analytical apparatus comprising in combination a carrier gas preheating conduit having an inlet and an outlet and containing a gas permeable mass of heat conductive metal particles, a carrier gas source, conduit means connecting said carrier gas source and the inlet of said carrier gas heating conduit, a sample vaporizing conduit having an inlet and an outlet and containing a gas permeable mass of heat conductive metal particles, means for heating said sample vaporizing conduit, conduit means connecting the outlet of said carrier gas heating conduit and the inlet of said sample vaporizinig conduit, sample introduction means for introducing a sample of the mixture to be analyzed in unvaporized form into the conduit means connecting the carrier gas heating conduit and the sample vaporizing conduit, a chromatographic separating column having its inlet connected to the outlet of the sample vaporizing conduit, means independent of the aforesaid means for heating the sample vaporizing conduit and independent of the heating means hereinafter referred to for maintaining the carrier gas heating conduit and the effluent heating conduit at constant temperature, for raising the temperature of the chromatographic separating column in a controlled manner during passage therethrough of the components to be separated, detecting means sensitive to variations in the composition of the chromatographic separating column effluent, an effluent heating conduit containing a mass of gas permeable, heat conductive metal particles, said conduit connecting the outlet of the chromatographic separating column and the detecting means, and heating means common to said carrier gas heating conduit and said effluent heating conduit for maintaining these conduits at the same constant temperature.

2. Analytical apparatus comprising in combination a heat conductive metal mass, means for heating said mass to a relatively constant temperature, a carrier gas preheating conduit embedded in said metal mass, said conduit having an inlet and an outlet and containing a gas permeable mass of heat conductive metal particles, a carrier gas source, conduit means connecting said carrier gas source and the inlet of said carrier gas heating conduit, a sample vaporizing conduit embedded in said metal mass, said conduit having an inlet and an outlet and containing a gas permeable mass of heat conductive metal particles, conduit means connecting the outlet of said carrier gas heating conduit and the inlet of said sample vaporizing conduit, sample introduction means for introducing a sample of the mixture to be analyzed in unvaporized form into the conduit means connecting the carrier gas heating conduit and the sample vaporizing conduit, a chromatographic separating column having its inlet connected to the outlet of the sample vaporizing conduit, means for raising the temperature of the chro tographic column in a controlled manner, and thermal conductivity detecting means embedded in said metal mass, said means comprising a reference cell in association with the carrier gas heating conduit, and a detector cell in association with the effluent heating conduit, said detector cell being sensitive to variations in the thermal conductivity of the effluent from the chromatographic separating column, with respect to that of the carrier gas passing through the reference cell, an effluent heating conduit embedded in said metal mass containing a mass of gas permeable heat conductive metal particles, said conduit connected to the outlet of the chromatographic separating column.

References Cited by the Examiner

UNITED STATES PATENTS

| 1,716,333 | 6/29 | Vuilleumier | 257—262.10 |
| 2,841,005 | 7/58 | Coggeshall | 73—23.1 |

OTHER REFERENCES

ISA Journal: "Gas Chromatography in Plant Steams," by D. H. Fuller; vol. 3, No. 11, November 1956; pages 440–444 relied on.

Kirkland: article in Gas Chromatography, edited by Coates et al., Academic Press, New York, 1958, pages 203 to 212.

RICHARD C. QUEISSER, Primary Examiner.

ROBERT EVANS, JOSEPH P. STRIZAK, Examiners.